(12) United States Patent
Sutehall et al.

(10) Patent No.: US 7,447,406 B2
(45) Date of Patent: Nov. 4, 2008

(54) COATED OPTICAL FIBRE UNIT AND METHODS OF MANUFACTURING COATED OPTICAL FIBRE UNITS

(75) Inventors: Ralph Sutehall, Eastleigh (GB); Martin Vincent Davies, Eastleigh (GB); Roger John Pike, Eastleigh (GB); Davide Ceschiat, Milan (IT); Massimo Pizzorno, Milan (IT)

(73) Assignees: Prysmian Cables & Systems Limited, Hampshire (GB); Pirelli S.p.A., Milan (IT)

( * ) Notice: Subject to any disclaimer, the term of this patent is extended or adjusted under 35 U.S.C. 154(b) by 0 days.

(21) Appl. No.: 11/441,353

(22) Filed: May 26, 2006

(65) Prior Publication Data

US 2007/0063363 A1 Mar. 22, 2007

Related U.S. Application Data

(63) Continuation of application No. 10/509,116, filed as application No. PCT/GB03/01064 on Mar. 13, 2003, now abandoned.

(30) Foreign Application Priority Data

Mar. 28, 2002 (EP) ................................. 02252345

(51) Int. Cl.
*G02B 6/44* (2006.01)
*G02B 6/00* (2006.01)
*D02G 3/00* (2006.01)
*B05D 5/06* (2006.01)
*B05D 3/02* (2006.01)

(52) U.S. Cl. .................. 385/109; 385/141; 428/370; 427/163.2; 427/372.2; 427/376.1

(58) Field of Classification Search ............... 385/109, 385/141; 428/370; 427/163.2, 372.2, 376.1
See application file for complete search history.

(56) References Cited

U.S. PATENT DOCUMENTS 4,490,828 A * 12/1984 Fukuhara et al. ............ 373/117

(Continued)

FOREIGN PATENT DOCUMENTS

DE 100 03 470 A1 8/2001

(Continued)

OTHER PUBLICATIONS

Showa Electric Wire Co., "Filament for Fibre Bundle Used As Light or Image Guide", Derwent Abstract of JP 59-188604, Oct. 26, 1984.

(Continued)

*Primary Examiner*—K. Cyrus Kianni
(74) *Attorney, Agent, or Firm*—Finnegan, Henderson, Farabow, Garrett & Dunner, L.L.P.

(57) ABSTRACT

An optical fiber unit having a sheath and a plurality of optical fiber elements loosely housed in the sheath. The sheath is coated with particles of an adherence reducing substance and has a radial thickness that is not substantially greater than 0.3 mm. The coating of adherence reducing particles is applied as a liquid coating. The liquid coating is a dispersion of the particles and heat is applied to evaporate the liquid content of the liquid coating to produce a dry coating of particles on the sheath.

21 Claims, 2 Drawing Sheets

U.S. PATENT DOCUMENTS

| | | | |
|---|---|---|---|
| 4,530,750 A * | 7/1985 | Aisenberg et al. | 204/298.24 |
| 4,801,186 A * | 1/1989 | Wagatsuma et al. | 385/128 |
| 4,952,021 A | 8/1990 | Aoki et al. | |
| 5,637,507 A * | 6/1997 | Wicks et al. | 436/166 |
| 5,649,043 A * | 7/1997 | Adams et al. | 385/110 |
| 5,684,904 A * | 11/1997 | Bringuier et al. | 385/109 |
| 5,686,150 A * | 11/1997 | Matsumoto | 427/558 |
| 5,698,615 A | 12/1997 | Polle | |
| 5,740,941 A * | 4/1998 | Lemelson | 220/62.15 |
| 5,751,880 A | 5/1998 | Gaillard | |
| 5,794,801 A * | 8/1998 | Lemelson | 428/698 |
| 6,022,620 A | 2/2000 | Wells et al. | |
| 6,051,096 A * | 4/2000 | Nagle et al. | 156/311 |
| 6,124,028 A * | 9/2000 | Nagle et al. | 428/308.8 |
| 6,146,699 A | 11/2000 | Bonicel et al. | |
| 6,178,278 B1 | 1/2001 | Keller et al. | |
| 6,253,012 B1 | 6/2001 | Keller et al. | |
| 6,487,347 B2 | 11/2002 | Bringuier | |
| 6,670,039 B1 * | 12/2003 | Nagle et al. | 428/408 |
| 6,807,347 B2 | 10/2004 | McAlpine et al. | |
| 2002/0001443 A1 | 1/2002 | Bringuier | |
| 2002/0197030 A1 | 12/2002 | McAlpine et al. | |

FOREIGN PATENT DOCUMENTS

| | | |
|---|---|---|
| EP | 0108590 A | 4/1984 |
| EP | 0 108 590 | 5/1984 |
| EP | 0 296 836 | 12/1988 |
| EP | 0 527 266 A1 | 2/1993 |
| GB | 2 156 837 A | 10/1985 |
| JP | 359188604 A | 10/1984 |
| JP | 11-38237 | 2/1999 |
| WO | WO 00/58768 | 10/2000 |

OTHER PUBLICATIONS

Norio; "Strand Fiber for Bundled Fiber" Patent Abstracts of Japan, of JP 59-188604, Oct. 26, 1984.

Shigeji; "Method for Adhering Antifriction Agent to Optical Fiber Bundle", Patent Abstracts of Japan, of JP 11-038237, Feb. 12, 1999.

Griffioen et al.; "Versatile Outside Plant Solution for Opticla Access Networks"; International Wire & Cable Symposium Proceedings, pp. 152-156, (1999).

Heino et al.; "Novel Non-Metallic Multilayer Fiber Optic Cables Based on Cone Extusion Process"; International Wire & SCable Symposium Proceedings, pp. 385-392, Dec. 1999.

Journeaux; "The Development of Improved Performance Cables for Hostile Environments"; PRI Manchester Section Conference, "Polymers in Cables", May. 18-19 (7 pages), 1983.

Product Data Sheet for Aquadag, Water-Based Graphite Coating, Acheson Colloids Company, pp. 1-3,http://www.achesonindustries.com/adag-add.html, (2002).

Product Data Sheet for Aquadag, Colloidal Graphite in Water, Acheson Colloids Company, (11 pages), 2001.

Data Sheet for Rapier, Pirelli, "Fibre Bundles With An Easy Peel Coating", 5 pages, htt://www.uk.pirelli.com/en_GB/cables-systems/telecom/products_solutions/optical_ca... (2003).

Pirelli's "Enhanced Performance Fibre Unit", 1 page of schematic illustration, undated.

PCT Search Report for PCT/GB03/01064, Dec. 1999.

* cited by examiner though the sheath has a wall thickness substantially greater than 0.3 mm.

COATED OPTICAL FIBRE UNIT AND METHODS OF MANUFACTURING COATED OPTICAL FIBRE UNITS

This is a continuation of application Ser. No. 10/509,116, filed Sep. 28, 2004 now abandoned, which is a national phase application based on PCT/GB03/01064, filed Mar. 13, 2003, and claims benefit of European Patent Application No. 02252345.0 filed Mar. 28, 2002, all of which are incorporated herein by reference.

FIELD OF THE INVENTION

The present invention relates to optical fibre units comprising a thin-walled sheath and methods of manufacturing such optical fibre units. The invention is particularly directed to optical fibre units to be installed by blown fibre techniques.

BACKGROUND ART

EP A 0 108 590 discloses a method of installing optical fibre units along a previously installed conduit or duct by drag forces generated by a gaseous flow blown along the duct.

Generally speaking, it is desirable to increase the distances over which optical fibre units can be blown, as otherwise it can be necessary to install separate lengths of optical fibre unit, which then have to be spliced together. Splicing involves expense and time as it will often require the digging of holes in a pavement (sidewalk) or roadway in order to gain access to the ducting and then breaking into the ducting before the splice can be made.

Many factors affect the distance over which an optical fibre unit can be blown. Two known factors are friction between the sheath and the ducting and the build-up of static charges that tend to cause the sheath to adhere to the ducting.

EP A 0 108 590 discloses the possibility of blowing compounds in liquid or powder form along the ducting prior to, or during, installation in order to provide lubrication for the optical fibre unit and suggests powdered talc as a suitable lubricant. GB-A-2 156 837 is also concerned with optical fibre units to be installed by blown fibre installation techniques. This document discloses incorporating an adherence reducing substance in the ducting and/or the sheath of the optical fibre unit. The example given is of an extruded polyethylene conduit to which is added less than 3% by volume of a compound commercially available from BXL Plastics Ltd of Grangemouth, Stirlingshire, United Kingdom. The compound is known as PZ 146 and comprises a slip agent, an anti-block agent, an anti-static agent and an antioxidant. The slip agent and anti-static agent of PZ 146 are such that they migrate to the surface of the conduit to reduce friction and improve the dissipation of static electric charges generated during installation of the optical fibre unit. There is no specific disclosure of a particular adherence reducing substance incorporated in a sheath. The document also mentions the possibility of coating a sheath with an adherence reducing substance, but provides no disclosure of how this is done or of suitable coating materials.

Other factors that affect the distances over which optical fibre units can be blown are the weight of the unit, the difference between the outside diameter of the unit and the internal diameter of the ducting and the stiffness of the optical fibre unit.

Hitherto, commercially available optical fibre units (2, 4 and 8 fibre units) have relied on a tight package construction to provide the rigidity necessary to permit blowing. The tight resin sheath for the fibres is typically imbedded with glass beads that serve to reduce the friction between the sheath and the ducting.

One approach to increasing the potential blowing distances of these constructions would be to reduce the overall diameter of the package. However, this would reduce the number of optical fibres that could be included in the package. An alternative approach would be to reduce the thickness of the optical fibre cable sheath. However, if the sheath thickness is reduced, the inclusion of lubricating additives or glass beads in the sheath material is problematical and conventional coating processes are unsuitable for coating a thin-walled sheath.

SUMMARY OF THE INVENTION

An aspect of the invention provides an optical fibre unit comprising a sheath and a plurality of optical fibre elements loosely housed in said sheath, said sheath having a coating of adherence reducing material particles and a radial thickness not substantially greater than 0.3 mm.

Preferably said adherence reducing material is graphite.

Another aspect of the invention provides an installation comprising a conduit and at least one optical fibre unit as described in either of the last two preceding paragraphs, the or each said optical fibre unit having been installed in said conduit be blowing the optical fibre unit along said conduit.

Another aspect of the invention provides a method of coating an optical fibre unit that comprises a polymeric sheath and a plurality of optical fibre elements loosely housed in said sheath, said method comprising applying a liquid coating comprising a dispersion of adherence reducing material particles to said sheath and applying heat to the optical fibre unit to produce a dry coating of said particles on said sheath.

Preferably, the liquid coating is applied to the polymeric sheath at room temperature.

Preferably, the liquid coating comprises graphite particles and water.

Another aspect of the invention provides an installation comprising a conduit and at least one optical fibre unit manufactured according to the method described in any one of the last three preceding paragraphs, the or each said conduit having been installed by blowing the optical fibre- unit along the conduit.

BRIEF DESCRIPTION OF THE DRAWINGS

In order that the invention may be well understood, some embodiments, which are given by way of example only, will now be described with reference to the drawings, in which.

DETAILED DESCRIPTION OF THE INVENTION

Figure 1:
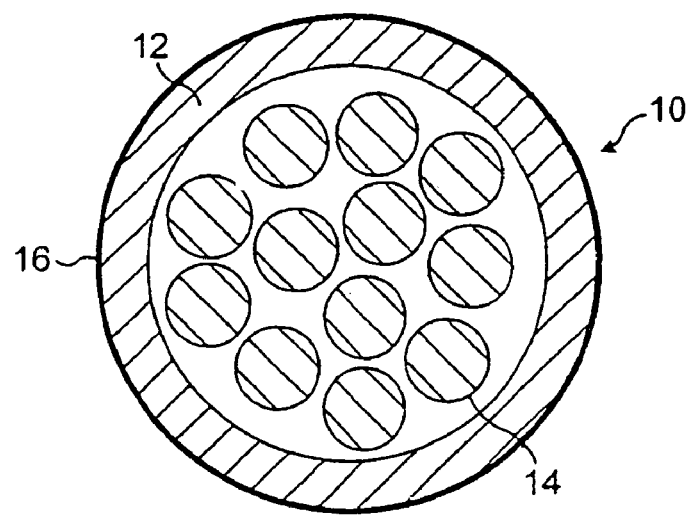
FIG. 1 is a schematic cross-sectional view of an optical fibre unit according to the invention.

Referring to FIG. 1, an optical fibre unit 10 comprises a thin-walled sheath 12 and a plurality of optical fibre elements 14. The sheath 12 has a coating 16 in the form of adherence reducing substance, preferably comprising ultra fine graphite particles.

In a preferred embodiment, the coating 16 comprises graphite particles having a nominal diameter of 1 to 2 microns with a maximum value of 8 microns.

Alternatively, other adherence reducing materials can be used, such as molybdenum disulfide of polytetrafluoroethylene (PTFE) particles.

The thin-walled sheath 12 has a radial thickness of not more than about 0.3 mm, preferably of not more than about 0.2 mm. A thickness not lower than about 0.05 mm is preferred and most preferably said thickness is in the region of 0.05 to 0.15 mm. In a preferred embodiment the sheath has an outside diameter of 1.35 mm+/−0.05 mm and an inside diameter of 1.1 mm+/−0.05 mm. The sheath may be made from a polymeric composition including a polymeric material and optionally an inert filler. The polymeric material can be for instance a polyolefin, such as polyethylene, polypropylene, ethylene-propylene copolymer, ethylene-vinylacetate copolymers (EVA) or polyvinyl chloride (PVC). Inorganic fillers which can generally be used are hydroxides, hydrated oxides, salts or hydrated salts of metals, in particular of calcium, magnesium, (uminium, also in admixture with other inorganic fillers such as silicates. The amount of inorganic filler may vary for instance from about 40% to about 90% by weight of the total weight of the polymeric composition. Conventional additives such as stabilizers, antioxidants, processing agents and coupling agents can be incorporated into the polymeric composition.

The sheath is preferably made of PVC or more preferably of a low smoke zero halogen polymeric compositions (LSOU). Suitable LSOH polymeric compositions typically comprise a polyolefin material (e.g. EVA or mixtures of EVA and polyethylene) and an inorganic filler (e.g. aluminium hydroxide), typically in an amount of about 50-70% by weight of the total composition.

In the preferred embodiment there are twelve optical fibres 14 contained in the sheath 12. The optical fibres 14 may be single-mode fibres, multi-mode fibres, dispersion shifted (DS) fibres, non-zero dispersion (NZD) fibres, or fibres with a large effective area and the like, depending on the application requirements of the optical fibre unit 10. If desired, some of the optical fibres 14 housed inside the sheath can be replaced by non-transmitting glass fibres in order to maintain an optimum fibre count within the sheath. The optical fibre elements 12 may be laid up in parallel formation or stranded around each other in SZ formation.

The sheath 12 may contain water blocking means, e.g. in the form of a grease like or oily filler such as, for instance, a silicon oil based filling composition. Alternatively the water blocking means can be in the form of water swellable powder compositions, for instance a mixture of polyacrylate particles and talc particles, as described in International Patent Application WO 00/58768.

The optical fibre unit is typically blown through a conduit, e.g. of polymeric material, such as polyethylene, particularly high density PE. Optionally, a low friction liner (e.g. silicon) is disposed within the bore.

The internal diameter of the conduit is typically of about 3 to 4 mm, e.g. about 3.5 mm. Accordingly, a plurality of optical fibre elements (e.g. three) can be blown through said conduit using conventional blowing techniques.

Figure 3:
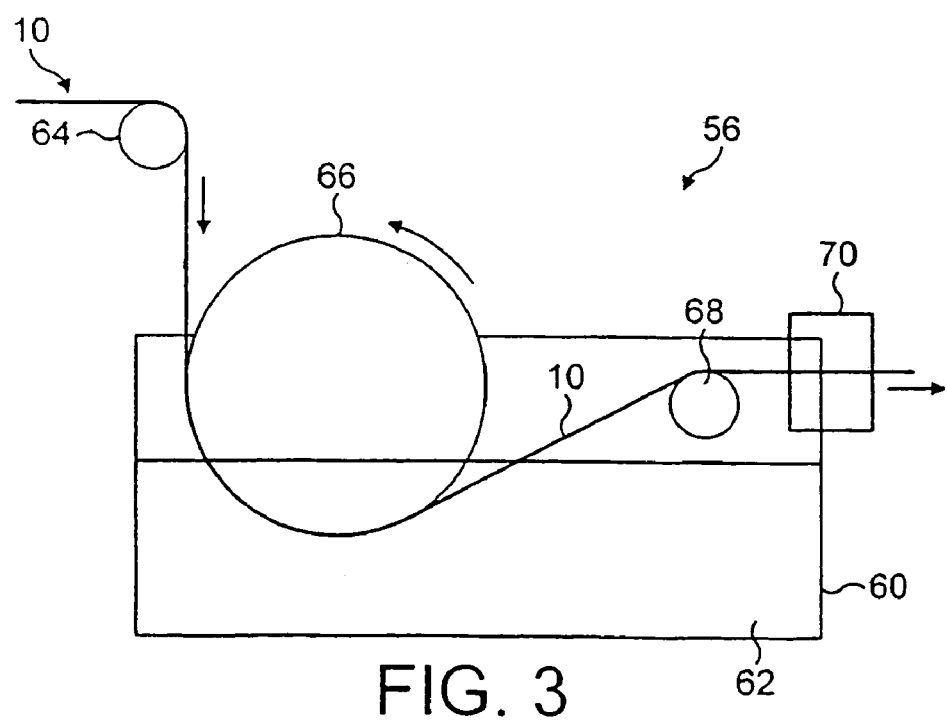
FIG. 3 is an enlarged view of a dipping bath of the apparatus of FIG. 2.
Figure 2:
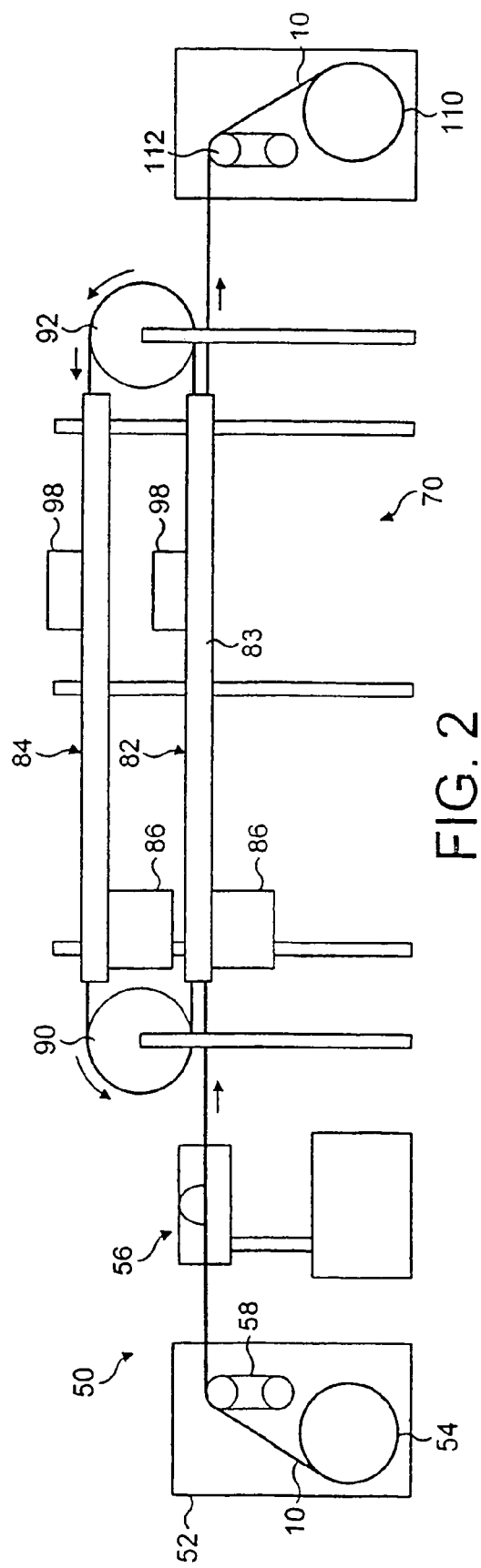
FIG. 2 is a side view of apparatus for coating the sheath of the optical fibre unit of FIG. 1.

Referring to FIGS. 2 and 3, an apparatus 50 for applying the coating 16 to the sheath 12 comprises an unwinding device 52 on which is mounted a coil 54 of uncoated optical fibre unit 10. Optical fibre unit 10 is led from the coil 54 to a dipping bath 56 via a drive belt 58. The drive belt 58 is arranged to provide a controlled unwinding tension, e.g. of about 200 g.

As best seen in FIG. 3, the dipping bath 56 comprises a vessel 60 containing a liquid dispersion 62 of the adhesion reducing coating material. The optical fibre unit 10 is directed into the vessel 60 via a guide roller 64 and passes under a relatively larger diameter pulley 66 that is partially submerged in the liquid 62 so that the optical fibre unit 10 is constrained to pass through the liquid. The liquid coating is applied onto the polymeric sheath at room, or ambient, temperature, i.e. at a temperature lower than 40° C., typically between 15° and 30°.

A further guide roller 68 is positioned downstream of the pulley 66 and arranged to guide the optical fibre unit 10 into a felt 70 that serves to remove excess liquid from the optical fibre unit.

A drying station 80 is situated downstream of the dipping bath 56. The drying station 80 comprises a first oven 82 and a second oven 84. Each oven comprises an elongate hollow body 83 through which the optical fibre unit can pass and a source of heat 86. In a preferred embodiment of the coating apparatus 50, the source of heat is a hot air blower 86. A suitable blower for this purpose is the Leister CH6065, which is rated at 3400 W. In the preferred embodiment, the length of the elongate bodies is approximately 0.3 m.

Respective guide pulleys 90,92 are provided adjacent the ends of the ovens 82,84 and arranged such that the optical fibre unit, having passed once through the lower oven 82 heading in the downstream direction of the apparatus, is directed upwardly into the upper oven 84 through which it passes heading in the upstream direction of the machine before being fed downwardly from the exit of the upper oven and into the lower oven 82 for a second pass therethrough.

Each oven 82, 84 is provided with a means 98 for monitoring the temperature within the oven. These monitoring means 98 include a suitable temperature sensor (not shown) and a display for displaying the sensed temperature. The temperature monitoring means may comprise any suitable sensor, display and circuitry and the like for conditioning the sensor signal as will all be well known to those skilled in the art. Accordingly, no detailed description of the temperature monitoring means will be supplied herein.

A winding device 110 is disposed downstream of the ovens 82, 84 to receive the coated optical fibre unit 10. The winding device 110 comprises a driven belt 112 that provides a controlled winding tension, e.g. of about 200 g. The winding device 110 further comprises a suitable mounting for a spool onto which the coated optical fibre unit 10 is coiled.

In order to manufacture an optical fibre unit 10, the required number of optical fibre elements 14 are passed through an extrusion cross-head and the thin-walled sheath 12 is extruded around the fibre elements. On exiting the extruder, the sheath is air-cooled and the optical fibre unit is coiled on a spool. The equipment on which these processes are carried out is conventional and known to those skilled in the art and will not therefore be described in detail herein. The spool is later fitted onto the unwinding device 52 of the coating apparatus 50 and an end of the coil 54 of optical fibre unit is fed through the apparatus and onto an empty spool fitted on the winding device 110.

In a preferred embodiment of the method of manufacture, the vessel 60 is filled with a coating liquid 62 including ultra fine dispersed graphite particles. A commercial product known as Aquadag Dag® T144 made by Acheson Colloids Company of Prince Rock, Plymouth 266351 USA is advantageously employed, which is a concentrated dispersion of ultra fine graphite particles in water. This material is thixotropic and is normally diluted using distilled or soft mineral water in order to obtain a suitable consistency. A surfactant, preferably of the non ionic type, is preferably added to the liquid 62, e.g. in an amount of 0.5 to 5% by weight, for increasing the wettability of the sheath material. Preferably, the non ionic surfactant is an ethoxylated derivative of a (C8-C12) alkylphenole. In the preferred embodiment, 1% by weight of IGEPAL CO/620 (Rhone-Poulenc) was added.

The unwinding and winding devices 54, 110 are operated to provide a line speed of 40 m/min. The ovens 82, 84 are set to a temperature of 108° C. After an initial phase of a run, in order to maintain the 108° set temperature, the heating power supplied to the hot air blowers has to be increased to take account of the. evaporation of the water in the coating liquid 62.

Under the above process conditions, the temperature of the sheath during its first pass through oven 82 is in the region of 38° C. During the passage through the oven 84, the temperature of the sheath increases to approximately 40° C. and during the second passage through the oven 82, the temperature increases to approximately 57° C.

On exiting the oven 82 after its second passage therethrough, the liquid content of the liquid coating 62 has evaporated leaving a uniform layer 16 of ultra fine graphite particles on the sheath 12 to provide a coating that reduces the friction between the sheath and ducting during blown installation and assists in dissipating static electrical charges generated during installation. It has been found that this coating does not produce any appreciable variation in the transmitted properties of the fibres.

By the time the optical fibre unit has travelled from the oven 82 to the winding device 110, it will have cooled to a temperature in the region of 25° C. If desired a blower (not shown) can be provided downstream of the ovens 82, 84 to assist in cooling the optical fibre unit.

It will be understood that by making multiple passes through the ovens 82, 84, the liquid content of the liquid coating is evaporated without raising the temperature of the sheath to a level that could damage the sheath.

As observed by the Applicants, if the temperature of the polymeric material forming the sheath exceeds the softening point of the material, irreversible changes in the sheath can be produced. For example, the sheath may distort and become oval in cross-section, which may in turn result in an attenuation of the signal transmitted by the optical fibre elements. In order to avoid said undesirable changes, the temperature of the polymeric material is thus preferably kept below its softening temperature. The softening temperature can be determined, for instance, according to ASTM D1525-00 (Standard Test Method for Vicat Softening Temperature of Plastics). Preferably, the temperature is kept about at 10° C. below the softening temperature of the polymeric material forming the sheath of the optical fiber unit.

In embodiments run by the Applicants, the sheath materials were a low smoke zero halogen and a PVC. The softening temperature of the polymeric sheath material was approximately 70° C. and by making multiple passes through the drying chambers as described, it was ensured that the temperature of the sheath did not substantially exceed 60° C. The coated optical fibre units produced by the Applicants using this process were provided with a uniform layer of ultra fine graphic particles and no appreciable deterioration in the optical properties of the fibre elements was detected. It will be appreciated that the specific temperatures mentioned above are given by way of example and may be altered to suit the material from which the sheath is made.

The use of a coated thin-walled sheath loosely housing the optical fibre elements provides an optical fibre unit for blown installation that has many advantageous features as compared with the optical fibre units presently commercially available for blown fibre installation. One advantage is that the low temperature performance of the unit is improved. This is because the optical fibre elements are not in close contact with the sheath so that when the sheath contracts when subject to low temperatures, the optical performance of the fibres will not be affected.

A further advantage of the thin-walled sheath is that it permits easy break out of the optical fibre elements making it unnecessary to provide a ripcord.

Yet another advantage of the thin-walled sheath is the improved flexibility of the optical fibre unit when there is a high fibre count. As previously mentioned currently available products consist of a bundle of optical fibre elements tightly E in a resin sheath. A that package of eight fibres in a resin sheath results in a relatively inflexible unit that can restrict installation performance along difficult routes. Using a coated thin-walled sheath, the Applicants have produced a twelve-fibre optical fibre unit that has improved flexibility and installation performance even along difficult routes.

The invention claimed is:

1. A method of coating an optical fibre unit that comprises a polymeric sheath and a plurality of optical fibre elements loosely housed in said sheath, said method comprising applying a liquid coating comprising a dispersion of adherence reducing material particles to said sheath and applying heat to the optical fibre unit to produce a dry coating of said particles on said sheath.

2. The method as claimed in claim 1, wherein said liquid coating is applied to the polymeric sheath at room temperature.

3. The method as claimed in claim 1, wherein said liquid coating comprises graphite particles and water.

4. The method as claimed in claim 3, wherein said heat applied to said optical fibre unit evaporates the water content of said liquid coating.

5. The method as claimed in claim 1, wherein said particles have a nominal diameter not substantially greater than 8 microns.

6. The method as claimed in claim 5, wherein said particles have a mean nominal diameter not substantially greater than 2 microns.

7. The method as claimed in claim 1, wherein said heat is applied such that the temperature of said sheath does not exceed the softening temperature of polymeric material forming the polymeric sheath.

8. The method as claimed in claim 7, wherein the temperature of said sheath is at least 10° C. lower than the softening temperature of the polymeric material.

9. The method as claimed in claim 1, wherein said heat applying step comprises passing the optical fibre unit through a plurality of drying chambers.

10. The method as claimed in claim 9, wherein as the optical fibre unit passes through each said drying chamber, substantially the same amount of heat is applied to the optical fibre unit.

11. The method as claimed in claim 9, wherein said optical fibre unit passes more than once through at least one of said drying chambers.

12. The method as claimed in claim 9, wherein the direction of movement of the optical fibre unit is different when passing through one of said drying chambers to the direction of movement when passing through one or more of the other drying chambers.

13. The method as claimed in claim 9, wherein said drying chambers each have a length, said length being not substantially greater than 0.35 mm.

14. The method as claimed in claim 9, wherein said drying chambers each have a length, said length being not greater than approximately 0.31 mm.

15. The method as claimed in claim 1, further comprising applying a surfactant to assist in the application of said liquid coating to said sheath.

16. The method as claimed in claim 1, wherein said liquid coating is applied to said sheath by passing said optical fibre unit through a vessel containing said liquid coating.

17. The method as claimed in claim 16, further comprising applying a surfactant to assist in the application of said liquid coating to said sheath wherein said surfactant is contained in said vessel.

18. The method as claimed in claim 1, wherein said optical fibre unit moves substantially continuously at a speed of approximately 40 m/min during said liquid coating and heat applying steps.

19. An installation comprising a conduit and at least one optical fibre unit coated by the method of claim 1, said at least one optical fibre being installed in said conduit by blowing the optical fibre unit along said conduit.

20. A method of coating an optical fibre unit for blown fibre installation that comprises a polymeric sheath and a plurality of optical fibre elements loosely housed in said sheath, which sheath has a radial thickness not substantially greater than 0.3 mm, said method comprising applying a liquid coating comprising a dispersion of adherence reducing material particles to an outer surface of said sheath and applying heat to the optical fibre unit to produce a dry coating of said particles on said sheath.

21. A method of coating an optical fibre unit for blown fibre installation, said method comprising the steps of:
 forming a sheath around a plurality of optical fibre elements such that said optical fibre elements are loosely housed by the sheath, said sheath comprising a generally tubular wall having a radially outer surface and a radially inner surface and a radial thickness not substantially greater than 0.3 mm;
 applying a liquid coating comprising a dispersion of adherence reducing particles to said radially outer surface; and
 passing the optical fibre unit through a heated environment to dry said liquid coating to provide a dry coating of said adherence reducing particles adhering to said radially outer surface.

* * * * *